Aug. 9, 1927.
H. M. LUDWICK
1,638,775
LUBRICATOR
Filed June 2, 1923
4 Sheets—Sheet 1
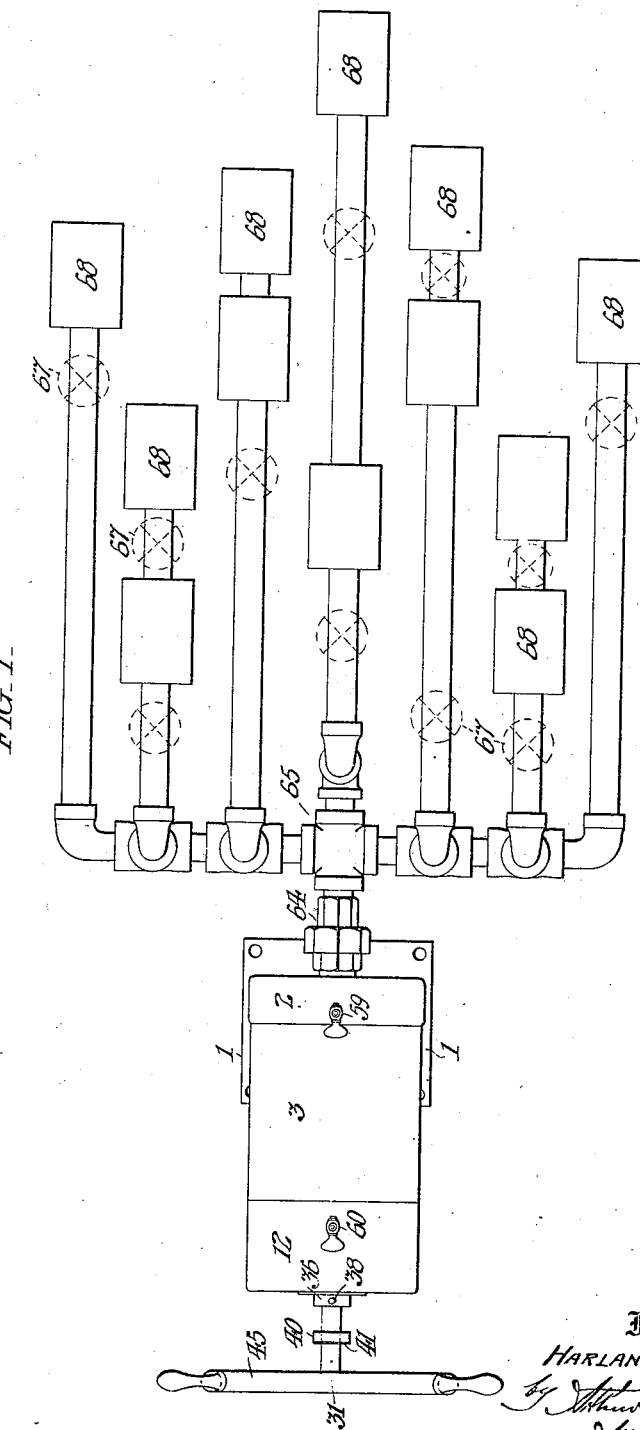
FIG. I.
Inventor:
HARLAN M. LUDWICK,

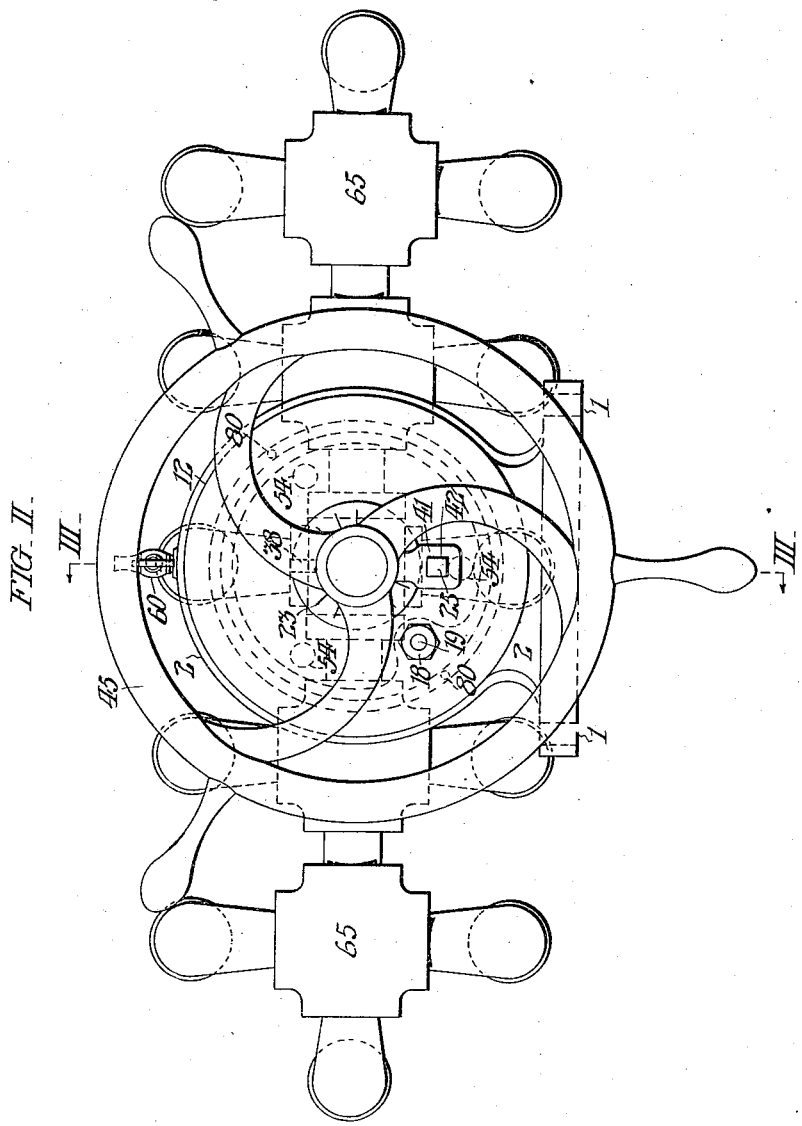

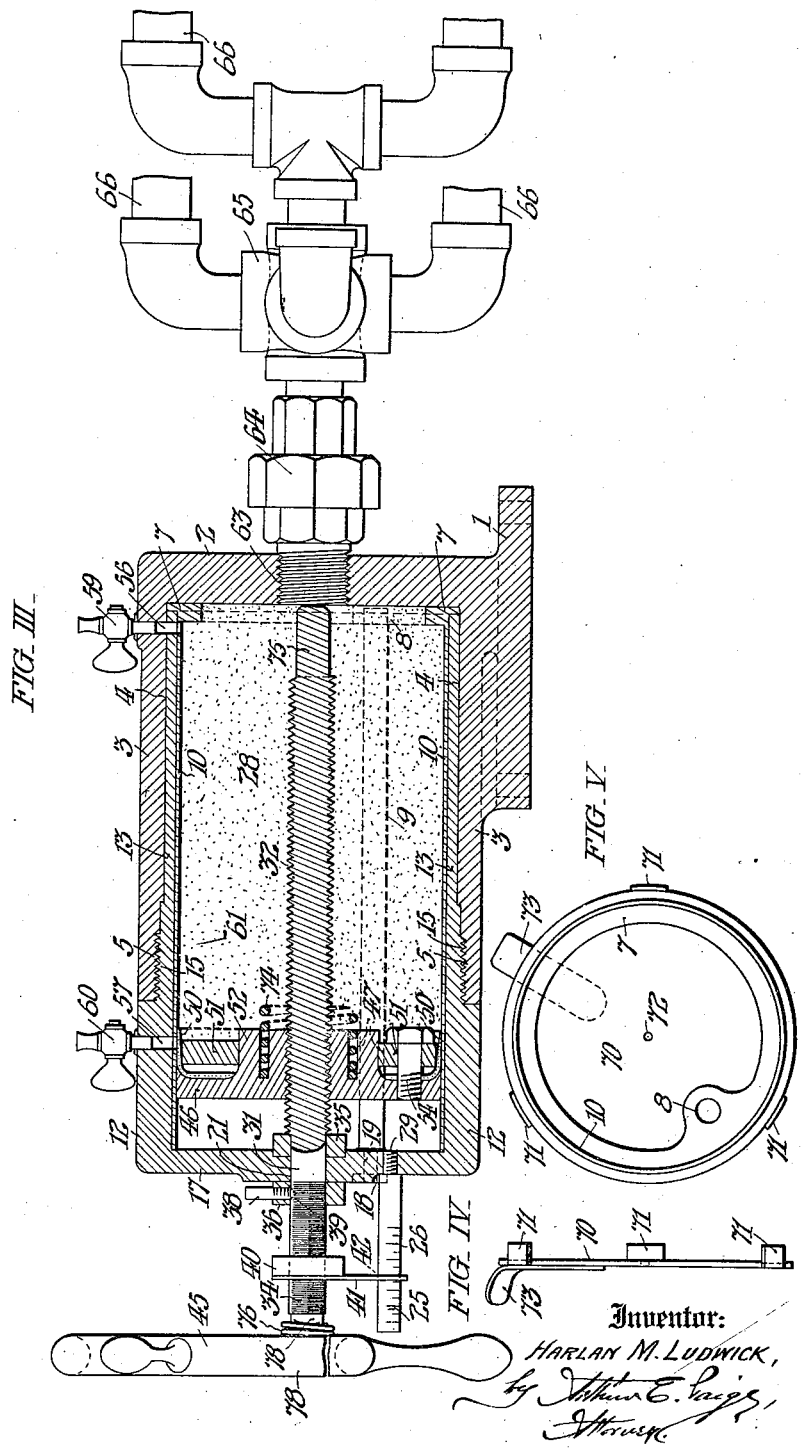

Aug. 9, 1927.
H. M. LUDWICK
1,638,775
LUBRICATOR
Filed June 2, 1923
4 Sheets-Sheet 4
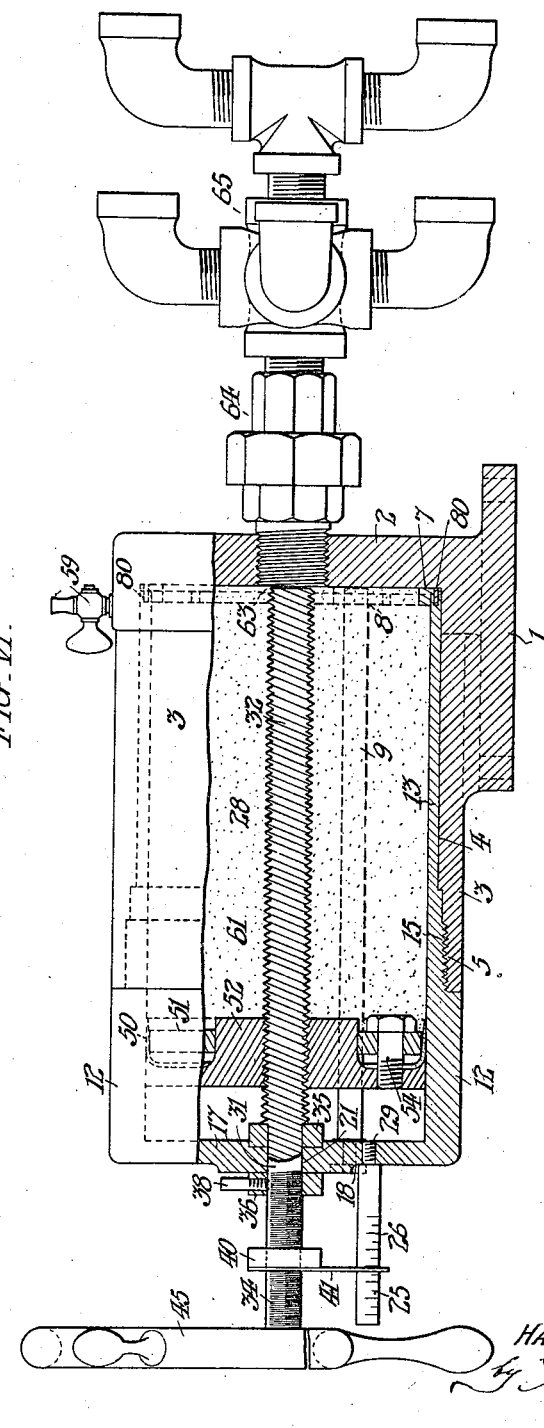
FIG. VI.
Inventor:
HARLAN M. LUDWICK, Patented Aug. 9, 1927.

1,638,775

UNITED STATES PATENT OFFICE.

HARLAN M. LUDWICK, OF PARKESBURG, PENNSYLVANIA.

LUBRICATOR.

Application filed June 2, 1923. Serial No. 643,059.

My invention relates to lubricators of the general class claimed in my copending application Serial No. 361,181 filed February 25, 1920, and includes certain improvements which have been demonstrated to be practicably desirable in the commercial utilization of that invention.

The general object and effect of my invention is to supply a lubricant such as grease to bearings at a predetermined rate determined to be necessary for the particular bearings, so as to avoid waste of the lubricant.

As hereinafter described, my invention includes a lubricator comprising a casing inclosing a grease chamber and having a port leading from said chamber into a manifold with which a series of grease conduits are connected so as to dispense the grease from said chamber to a plurality of bearings; a piston being fitted for axial reciprocation in said casing, in engagement with a screw shaft; means being arranged to prevent rotation of said piston when said screw shaft is rotated; whereby such rotation axially shifts said piston. Although said piston is thus common to a plurality of conduits leading to bearings requiring respectively different quantities of grease to lubricate them properly; such selective and differential distribution of the grease is controlled and effected by adjustment of valves in the respective conduits.

In the form of my invention described in said copending application; the screw shaft is journaled in a shallow cover for said casing which is detachably connected therewith by a screw thread. In accordance with my present invention, an extensive cylindrical loading barrel is substituted for said shallow cover. In said copending application, said shaft carries a grease container which is rotatable upon but removable by said shaft with said cover. In the form of my invention hereinafter described, the grease container is entirely independent of the screw shaft. In said copending application; the means for preventing rotation of the piston, to compel it to shift axially in the grease chamber when the screw shaft with which it is engaged is rotated; includes a rod which is fixed at one end in the container, carried by said screw shaft, but said rod has its opposite end free. As it is necessary to retain said rod substantially parallel with the axis of the screw shaft; and the operation of the latter tends to turn the piston and twist said rod out of such parallel relation; my present invention includes means to support the rod at both ends so as to insure that it shall not be accidentally displaced. In the form of my invention shown in said copending application; the piston remains continuously in engagement with the screw shaft when the parts of the apparatus are assembled in cooperative relation. It was found in practice that unskilled workmen sometimes turned the screw shaft in such a lubricator after the piston had reached the end of the grease chamber and with the result of jaming and damaging the screw threads of both the shaft and piston. Therefore, my present invention includes means to effect the disengagement of the piston from the screw shaft when the piston reaches the predetermined limit of its movement in the grease chamber, incident to rotation of the screw shaft in one direction, and to automatically reengage the piston with the screw shaft thread when the screw shaft is turned in a reverse direction; such means including a spring arranged to thrust the piston axially toward the center of the grease chamber. My invention also includes other novel features of construction and arrangement hereinafter more definitely specified; for instance, a grease container which serves as a cartride for grease to be supplied to said chamber may be combined with the guide rod support aforesaid. Said copending application describes means for manifesting the extent of the axial movement of the piston and including an indicating nut arranged to traverse a screw thread on said screw shaft, exterior to the casing, and having a pointer radially projecting through a slot in a scale plate fixed upon said cover. My present invention includes a modification of such indicating means in that the pointer element is perforated and a gauge bar, provided with a scale or scales of graduations, extends through it, parallel with the screw shaft, and in addition to that means for manifesting the extent of the axial movement of the piston, in terms of grease displaced from the chamber; I provide the screw shaft with a radial index pointer in cooperative relation with a circular series of graduations, to enable the operator to more precisely determine the quantity of grease dispensed.

An important feature of the present form of my invention is the inclusion therein of air vents from each end of the grease chamber controlled by cocks so as to permit said chamber to be entirely filled with grease without trapping air therein and also permit the ready insertion and removal of the grease container; said vents permitting the escape of air under pressure when the grease is inserted, and permitting the influx of air to relieve the partial vacuum which would otherwise be formed by withdrawal of said container.

My invention includes the various novel features of construction and arrangement hereinafter more definitely specified.

In said drawings; Fig. I is a plan view of a lubricator embodying my invention, in cooperative relation with twelve bearings.

Fig. II is a front end elevation of said lubricator.

Fig. III is a fragmentary longitudinal sectional view of said lubricator, taken on the line III, III in Figs. I and II.

Fig. IV is an edge view of a pressed sheet metal temporary cap for the combination guide plate and grease container shown in section in Fig. III.

Fig. V is an end view of said combination guide plate and grease container shown in section in Fig. III, with said temporary cap fitted thereon.

Fig. VI is a fragmentary longitudinal sectional view, similar to Fig. III, but showing a simplified form of my invention.

In said Figs. I to V inclusive, the lubricator base 1 is provided with the standard 2 forming the right-hand end of the lubricator casing 3 which is a cylindrical tubular extension from said standard 2, overhanging said base 1 and forming a socket 4 with an internal screw thread 5 at the end of said extension. The guide plate 7, shown in Figs. III and V, is an annulus having a circular perimeter and is fitted in said socket 4 against said standard 2. Said guide plate 7 has a bearing 8 adapted to detachably hold the guide rod 9. The grease container 10 is a cylindrical tube carried by said guide plate 7 and may be conveniently formed in unitary relation therewith.

The loading barrel 12 is cup shaped and has the cylindrical tubular portion 13 adapted to fit within said socket 4, exterior to said container 10, and against said plate 7, to hold the latter in the position shown in Fig. III; said barrel having the external screw thread 15 fitted to the thread 5 in said casing extension 3. Said loading barrel 12 has the end closure 17, in unitary relation with its said cylindrical tubular portion and carries said guide rod 9 which has its outer end rigidly secured in said closure, conveniently by the nut 18 engaging the reduced outer end 19 of said rod 9.

Said closure 17 has the axial bearing 21, in concentric relation with said socket 4 and screw thread 5, and has the circular series of graduations 23, in concentric relation with said bearing 21.

The gauge bar 25 extends exterior to said loading barrel 12 parallel with the axis of the latter. Said gauge bar 25 is conveniently of square cross section, and provided with a scale or scales 26 adapted to indicate the amount of grease dispensed from the chamber 28 in said casing 3, and is rigidly connected with said closure 17 conveniently by means of its end screw thread 29. The rotary screw shaft 31 extends through said axial bearing 21 in said closure 17, in which it is journaled for rotation, and has two screw threads 32 and 34, of respectively different pitch, conveniently twelve and forty-eight threads per inch, respectively extending within said container 10 and exterior to said closure 17. The circular collar 35, which is conveniently removably mounted on said screw shaft 31 forms an axially stationary abutment on said shaft, at the inner side of said closure 17. The circular collar 36, which is conveniently internally screw threaded to fit the thread 34 on said screw shaft 31, forms an axially movable abutment on said shaft at the outer side of said closure 17 and is provided with means detachably securing it on said shaft; including the set screw 38 extending in the recessed spot 39 of said shaft 31 and projecting radially from said abutment 36 and comprising an index pointer, in cooperative relation with said circular series of graduations 23.

The indicator nut 40, which is fitted to traverse said exterior screw thread 34 on said screw shaft 31 carries the gauge plate 41 having the opening 42 through which said gauge bar 25 extends; whereby, rotation of said screw shaft 31 causes said indicator nut 40 to move axially on said shaft 31, screw thread 34, and shift the position of said gauge plate 41 with reference to said gauge bar 25 and the graduations of the scale 26 thereon.

Said screw shaft 31 may be provided with any suitable means to effect its rotation. However, I have shown a hand wheel 45 rigidly connected with the outer end of said shaft for that purpose. The piston 46, comprising a diaphragm in said grease chamber 28, is fitted for axial movement in said container 10 and engages said screw thread 32 on the inner portion of said screw shaft 31 as a nut, and has the slide bearing 47 through which said guide rod 9 extends; whereby said piston is prevented from rotating. The cup leather 50 is carried by said piston 46, within said container 10, and is presented in contact with the inner surface of the latter by the follow plate 51 which is a ring encircling the axial boss 52 of said piston and conveniently adjustably connected with the diaphragm of said piston by the three screws 54.

In order to permit said chamber 28 to be entirely filled with grease without trapping air therein and also to permit the ready insertion and removal of said grease container 10; I provide said lubricator with air vents 56 and 57 respectively opening from the inner and outer ends of said grease chamber 28, and leading to the outer atmosphere; and provide said vents with respective stop cocks 59 and 60 whereby they may be independently opened and closed. It is to be understood that said vents permit the escape of air under pressure when the grease 61 is inserted and permit the influx of air to relieve the partial vacuum which would otherwise be formed by withdrawal of said container 10.

As shown in Fig. III; said grease chamber 28 in the lubricator casing 3, has a single lubricant discharge port 63 in the vertical standard 2 of said casing 3, and I find it convenient to dispense lubricant from that single port, to a plurality of bearings, by connecting that port, by the coupling 64, with the manifold 65 from which conduits 66, respectively controlled by valves 67, extend to respective bearings 68. Although I have shown twelve such conduits, in Figs. I and II, it is to be understood that a greater or less number may be connected with a single lubricator and supplied with lubricant by the movement of a single piston 46 as above described. Although said piston 46 is thus common to a plurality of said conduits 66, leading to bearings 68 requiring respectively different quantities of lubricant; such selective and differential distribution of the lubricant as is required may be effected by adjustment of said valves 67 in the respective conduits.

Said lubricator may be conveniently operated as follows: Said vent cock 59 being open; said loading barrel 12 may be unscrewed, so as to disengage its threads 15 from the threads 5 in said casing 3, and removed; thus releasing the lubricant container 10, which has been held in the socket 4 in said casing 3 in the position shown in Fig. III, by the tubular extension 13 of said loading barrel. Thereupon, said container 10 may be withdrawn from the socket 4 and be provided with the temporary cap 70 shown in Fig. IV, as shown in Fig. V; said cap 70 being temporarily held in engagement with said guide plate 7, by the respective cap clips 71 which resiliently engage said plate. Said cap 70 has the small perforation 72, conveniently at its axis, to permit escape of air as said container 10 is being charged with grease 61 or other lubricant which may be thrust into the open end of said container 10. When said container 10 is filled; said temporary cap 70 may be removed, conveniently by means of its handle 73, and the container 10 with its guide plate 7 replaced in the socket 4 in said casing 3 against said standard 2, as shown in Fig. III. Thereupon, said vent cock 60, in said loading barrel, being open, said barrel may be replaced in screw threaded connection with said lubricator casing 3, in the position shown in Fig. III. Thereupon, both of said cocks 59 and 60 may be closed and said piston 46 be axially shifted in said grease chamber 28 to supply grease through said conduits to said bearings 68, by rotating said screw shaft 31 by its hand wheel 45; the axial displacement of said piston being indicated by the traverse of said indicator gauge plate 41 with reference to the gauge bar 25 and the graduations 26 thereon, which latter may manifest such displacement in volumetric measurements of the grease dispensed. During such rotation of said screw shaft 31, said pointer 38 traverses the circular series of graduations 23 thus indicating fractions of a rotation of said shaft to enable the operator to effect such manipulation precisely and to permit of a record being made as to the precise amount of rotation of said shaft 31 required for a given unit of time of lubrication.

Such operation of said shaft may be continued until said piston 46 has reached the limit of its movement, determined by the axial length of the screw thread 32, and said piston is thus relieved from axial pressure of said screw by after rotation of said shaft in the same direction. However, in order to reengage said piston 46 with said screw thread 32; I provide said piston hub 52 with a spring 74 encircling said screw shaft 31 and adapted to encounter said standard 2, against which it is compressed when said piston is in the released position, at the inner end of said shaft 31, where it is upheld by the smoothly cylindrical support 75 which is conveniently formed as part of said screw shaft 31, but which may be connected with said casing standard 2. Of course, said spring 74 is thus arranged to thrust said piston 46 axially in said chamber 28 toward the center thereof; so that upon reverse rotation of said screw shaft 31, it is reengaged with said piston 46 so that the latter may be axially shifted in the reverse direction, toward the left in Fig. III, to the initial position which it occupies when said chamber 28 is entirely filled with lubricant 61.

Of course, if said screw shaft 31 be rotated in the direction to thrust said piston 46 toward the right in Fig. III, after said piston is disengaged from said screw thread 32 on said shaft; the calibration of the indicator nut 40 with reference to the position and traverse of said piston 46 would be nullified.

Therefore, I prefer to provide the outer end of said screw shaft 31 with similar means for effecting disengagement and reengagement of said nut 40 with the screw thread 34 on said shaft. Such means includes the spring 76, carried by said hand wheel 45 and arranged to be compressed against said nut 40 when said nut reaches the outer end of said screw thread 34; in which position said nut 40 is upheld by the smoothly cylindrical support 78, which is conveniently formed on said screw shaft 31. The reverse rotation of said screw shaft 31 is thus effective to automatically reengage said nut 40 with its thread 34 simultaneously with the reengagement of said piston 46 with its thread 32 on said shaft.

Fig. VI shows a simplied form of my invention, differing from that above described in that the guide plate 7 for the rod 9 is not provided with a grease container 10. In order to prevent rotary displacement of said guide plates 7, I find it convenient to provide them with pins 80 for engagement with corresponding pin holes in the end of the loading barrels 12. In that simple form of my invention shown in Fig. VI, the loading barrel is, of course, unscrewed from the casing 3 when it is desired to charge the chamber 28 with grease and I also find it convenient to remove the guide plate 7, for that purpose, although it is unnecessary to do so as said plate has a large opening through it, as indicated in Fig. V. It may also be observed that the vent 57 and cock 60 are omitted from said simplified form of my invention, for the reason that the loading barrel may be charged with lubricant, as above described, without such vent and valve, which are, however, necessary when the lubricant is introduced to the loading barrel in the container 10 shown in Fig. III.

Therefore, I do not desire to limit myself to the precise details of construction and arrangement herein set forth, as it is obvious that various modifications may be made therein, without departing from the essential features of my invention, as defined in the appended claims.

I claim:

1. In a lubricator, the combination with a casing inclosing a grease chamber; of a piston fitted for axial reciprocation in said chamber; a screw shaft engaging said piston as a nut; means arranged to prevent rotation of said piston when said screw shaft is rotated, including a guide rod, extending through said piston; a removable guide plate fitted in said chamber, against the end of said casing and holding said guide rod, parallel with said screw shaft; whereby rotation of said screw shaft axially shifts said piston in said chamber.

2. In a lubricator, the combination with a casing inclosing a grease chamber; of a piston fitted for axial reciprocation in said chamber; a screw shaft engaging said piston as a nut; means arranged to prevent rotation of said piston when said screw shaft is rotated, including a guide rod, engaging said piston; a removable guide plate fitted in said chamber, against the end of said casing and holding said guide rod, parallel with said screw shaft; whereby rotation of said screw shaft axially shifts said piston in said chamber.

3. In a lubricator, the combination with a casing; of a piston fitted for axial reciprocation in said chamber; a screw shaft engaging said piston as a nut; means arranged to prevent rotation of said piston, including a guide rod, engaging said piston; a removable guide plate fitted in said chamber, and holding said guide rod, parallel with said screw shaft; whereby rotation of said screw shaft axially shifts said piston in said chamber.

4. In a lubricator, the combination with a casing; of a piston fitted for axial reciprocation in said casing; a screw shaft engaging said piston as a nut; means arranged to prevent rotation of said piston when said screw shaft is rotated, including a guide rod, engaging said piston; a removable guide plate fitted in said casing and holding said guide rod; whereby rotation of said screw shaft axially shifts said piston in said chamber.

In testimony whereof, I have hereunto signed my name at Parkesburg, Pennsylvania, this 24th day of May, 1923.

HARLAN M. LUDWICK.